July 11, 1939.   R. W. ERDLE   2,165,466
METHOD OF MAKING SHELL-LIKE PORCELAIN TOOTH STRUCTURES
Filed Dec. 28, 1936
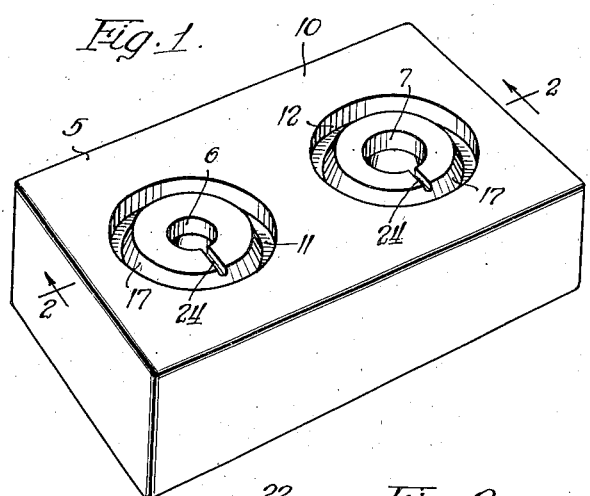
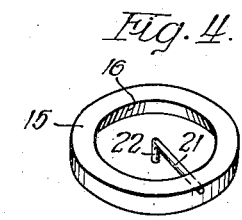
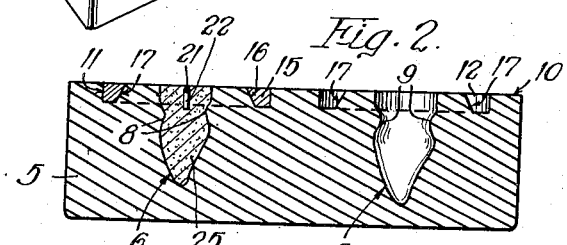
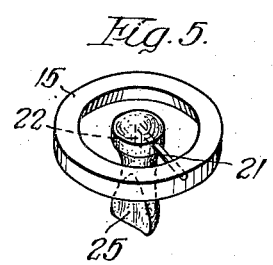
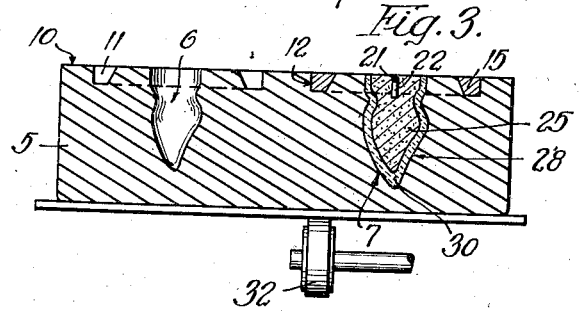
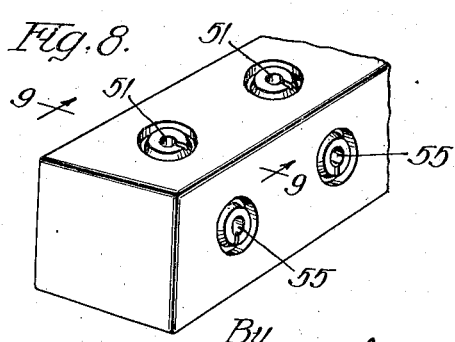
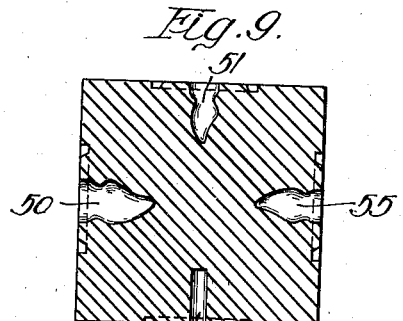
Inventor
Reiner W. Erdle.
By
Brown, Jackson, Boettcher & Dienner
Attys.

Patented July 11, 1939

2,165,466

UNITED STATES PATENT OFFICE 2,165,466

METHOD OF MAKING SHELL-LIKE PORCELAIN TOOTH STRUCTURES

Reiner W. Erdle, Chicago, Ill., assignor to Dental Research Corporation, a corporation of Illinois Application December 28, 1936, Serial No. 117,695

8 Claims. (Cl. 18—55.1)

This invention relates to tooth structures of improved shell-like form, and to a new and improved method of and means for making the same.

The invention relates particularly to the use of a core, preferably with a flexible mold, in the making of porcelain teeth, and to producing the tooth structure of improved shell-like form by supporting the core in the tooth cavity of the mold with a space between the core and said tooth cavity, filling this space with porcelain which has been moistened with water or other temporary binder, and packing the porcelain compactly in the mold cavity and around the core to the form of a firm shell-like body by prolonged vibration.

Further features and the advantages of the present invention will appear from the following detailed description taken in connection with the accompanying drawing, in which:

Figure 1 is a perspective view, showing one form of mold for use with the present invention;

Figure 2 is a longitudinal section taken on the line 2—2 of Figure 1, showing the step of preparing the core for use with the present invention;

Figure 3 is a longitudinal section similar to Figure 2, showing the step of preparing the shell-like body of the tooth;

Figure 4 is a perspective view of one of the washer and core-holding stem structures for use with the present invention;

Figure 5 is a perspective view of one of the washer and core-holding stem structures, showing a core attached to the stem part of such structure;

Figure 6 is a perspective view of one form of tooth formed according to the present invention;

Figure 7 is a perspective view of another form of tooth formed according to the present invention;

Figure 8 is a fragmentary perspective view of another form of mold embodying the present invention; and Figure 9 is a transverse section taken on the line 9—9 of Figure 8.

According to the present invention, a master core is carved as, for example, in a carving machine and out of metal, or any other suitable material. The dimensions of the master core are, as a rule, about one millimeter, less on all sides, except the bottom, than the master tooth to which the core belongs, although the particular relation between the dimensions of the master core and the dimensions of the master tooth may vary within the scope of the present invention.

The master tooth and the master core are set up on a plate or other suitable base member in such manner that the mold which is poured over the same will hold the washer and extending core supporting stem structures. The resulting mold is shown at 5 in Figures 1, 2 and 3. The mold 5 is formed of a flexible mold material, preferably rubber or a plasticized vinyl chloride material marketed under the name "Korojel". It is to be understood that gelatin, glue, and other suitable flexible materials are contemplated within the scope of the present invention.

In pouring the mold material over the master core and master tooth and onto the plate or other base on which the master tooth and master core are set up as above described, and allowing the flexible mold material to harden, there is formed therein a core forming cavity 6 and a tooth forming cavity 7, the dimensions of the cavity 7 being larger than the dimensions of the cavity 6 to give the shell-like tooth structure the desired thickness as will hereinafter appear. The cavities 6 and 7 open from the upper surface of the mold 5, and the particular cavities shown have undercuts at 8 and 9. Also formed in the upper surface 10 of the mold 5 are a pair of annular grooves or depressions 11 and 12, one substantially concentric with the opening of each of the mold cavities 6 and 7 from the mold surface 10.

The washer and extending core supporting stem structure comprises an annular metal ring 15, tapered at 16 to fit the corresponding tapered surfaces 17 of the grooves or depressions 11 and 12. This ring 15 has rigidly anchored thereto a stem 21 formed of wire or other suitable material. This stem 21 extends inwardly from the ring 15, and, at the center of the opening defined by the ring, is downturned at 22 to support the core, as will hereinafter appear.

After the mold 5 has been produced, the washer or ring 15 is inserted into the groove or depression 11 adjacent the core cavity 6, with the downturned end 22 of the stem 21 extending downwardly into the cavity. The upper surface of the mold is provided with a groove or depression 24 for accommodating the stem 21 with the ring 15 thus positioned. The core cavity 6 is then filled with hot wax or other suitable core material up around the downturned end 22 of the stem 21 and to position substantially flush with the open upper end of the cavity 6. The hot wax or other core material may be introduced into the core forming cavity by means of an eye-dropper, or in any other suitable or preferred manner. The wax or other core material is permitted to chill or set into the form of a firm core body and the washer or ring 15 is then removed from the mold with the core attached to the downturned end 22 of the stem 21, as indicated at 25 in Figure 5. The flexibility of the mold permits this removal of the core from the cavity 6, notwithstanding the character of the material forming the core and the undercuts or projecting parts 8.

The washer or ring 15 is then placed in the annular groove or depression 12 adjacent the tooth forming cavity 7, with the core formed of wax or other suitable material extending down into the tooth forming cavity 7, as shown in Figure 3. A space 28 (Figure 3) is thus formed between the core 25 and the tooth cavity 7. This space 28 is then filled up, as shown in Figure 3, with porcelain, preferably finely ground and moistened with water or other temporary binders, as more fully set forth in my copending application Serial No. 101,740, filed September 21, 1936. This filling of porcelain, which is indicated at 30 in Figure 3, is then packed to the form of a firm shell-like tooth body by prolonged vibration, as, for example, by suitable vibrating means shown at 32 in Figure 3. As illustrative of the extent of vibration preferably employed, I vibrate the porcelain material in the flexible mold and around the core 25 until no more liquid rises to the top, or until complete packing of the material and substantially maximum contact of the particles thereof is secured. This, of course, will vary considerably in actual practice.

The excess moisture is removed and the washer or ring 15, core 25, and green porcelain shell crown are removed from the flexible mold and placed into an oven which is warm enough to drive off the water which is still in the porcelain, and later to soften and melt the core. The core material upon softening and melting is preferably permitted finally to penetrate into the green porcelain shell crown. Upon cooling, the green porcelain shell crown is strong enough to be handled or stored away before firing. The porcelain shell-like tooth is later fire-hardened to form the finished tooth, as shown at 35 in Figure 6, or the finished shell-like tooth as shown at 36 in Figure 7, or any other desired tooth or tooth structure.

The formation of the shell-like tooth structures, shown for example at 35 and 36, by means of vibrating the porcelain into a flexible mold and around a core, makes it possible to produce a lighter tooth, having the porcelain only where it is required. In other words, it is possible to eliminate from the tooth all the porcelain which does not serve any purpose. Porcelain is heavier than the base plate materials, particularly the synthetic resins which are now used to a large extent, and a full denture in which porcelain shell-like teeth are used is lighter than the same full denture in which porcelain stock teeth have been used. Less porcelain is used in the shell-like tooth structures of the present invention.

A porcelain shell-like tooth, which is produced according to the present invention, as a rule requires no extra retention means. It is very seldom that the crown of a tooth is shaped so that it has no undercut, and if there is not a sufficient undercut to the form of the crown, it is a simple matter to machine the master core to provide the desired undercuts.

Another distinct advantage in handling a porcelain shell-like tooth structure, formed according to the present invention, lies in the fact that these shell-like teeth can be ground quite readily. The thickness of the shell varies according to the size of the tooth, from approximately 1½ mm. to ¾ of a mm. It is of course easier to grind a porcelain shell-like structure than a solid porcelain tooth.

Another exceedingly important advantage lies in the fact that it is possible to stain the inside of the shell-like tooth and thereby produce effects which are not obtainable in any other way. If, for instance, it is desired to give a porcelain tooth the appearance of a natural devitalized tooth, the required grey or brown stain may be applied on the inside or inner surface 40 or 40' of the porcelain shell-like structure. This produces the same effect which the discolored dentyne does in the case of a natural tooth. While it is not often that a dentist or dental mechanic is called upon to produce a tooth which has the appearance of a devitalized tooth, he is, however, frequently called on to make very slight alterations in the shade of a tooth in order to match the natural tooth or teeth as may be in the case of a partial denture restoration. These slight variations in shades can be produced by applying a stain or opacifier to the inside of the shell-like structure.

Various materials may be used as the core material. It is possible to use flexible wax or other flexible materials, such as "Korojel" material. It may be desirable to remove the core out of the green porcelain shell crown, and thereupon remove the green porcelain shell crown from the flexible mold to be dried out and dipped in wax. It is also possible to use an investment material which sets hydraulically or otherwise and which remains in the green porcelain shell crown until the same is fire-hardened. When an investment material is used which sets hydraulically and remains in the green porcelain shell crown it is possible to incorporate coarse fragments of porcelain-like material which will adhere to the inside of the shell-like tooth structure and provide retention. Where an investment material is used it is necessary to bear in mind that the investment material would have to shrink to the same degree as the porcelain shell upon firing. This, of course, is necessary regardless of whether or not the coarse fragments are used.

It is also possible to use synthetic resins or waxes which have a high melting point and which are compatible with the porcelain. A preferred material now contemplated consists of a synthetic resin RH (35), manufactured by Du Pont, which is slightly modified by an addition of about ten per cent to fifteen per cent of paraffin.

To the core material I contemplate adding various stains if it is desired to stain the inside of the porcelain shell crown. I also contemplate adding opacifiers and opacifiers and stains to the core material in order to prevent any of the denture base materials which may be used in the making of the denture to be visible through the porcelain shell crown. A common opacifier is clay. When this is mixed with the core material, some of the clay will adhere to the inside of the green porcelain shell-like tooth structure while the core material is softened through heat, and finally eliminated. The addition of stains to the core material acts in a like manner.

It is to be understood that where the shell-like tooth structures are molded to a denture base material this material is molded to and around the open ends of the shell-like tooth structures and preferably fills the interiors of these shell-like tooth structures. The denture base material which enters the shell-like tooth structure cooperates with the undercuts formed, for example, by the undercut portions 9 of the mold, to provide retention.

It is possible to alter slightly the cores if this may be required in special cases. If it should be necessary to have a thicker layer of porcelain on a certain part of the porcelain shell crown or shell-like tooth structure, the core of wax or other suitable material may be trimmed so as to increase the thickness in the porcelain shell crown or shell-like structure. By adding core material to the core, a correspondingly thinner porcelain shell crown or shell-like structure will be produced. It is also possible to add a small amount of core material in the form of a thin rod to the core. If this protrusion made out of core material touches the mold in which the porcelain tooth is being formed, an opening will result from this in the porcelain shell crown.

It is, of course, possible within the scope of the present invention to have many varieties of cores, rods, or sections which will fit into the mold in which the porcelain tooth is formed.

For instance, if a tube tooth is required, a rod made out of a core material may be sealed to the wire extension or downturned end 22 of the stem 21. It is also possible to produce facings which have retention slots in them in the same manner.

In order to save mold material and to keep the molds together, I contemplate also making the flexible molds with cavities on all four sides of the mold as shown in Figures 8 and 9. The cavities 50 are the cavities in which the shell-like tooth structures are formed. The cavities at 51 are the cavities in which small cores may be formed. The cavities 52 in the bottom of the mold 53 are cavities in which rods may be formed for producing tube teeth, and the cavities 55 are larger mold cavities than the cavities 51 in which somewhat larger cores may be formed to produce, with the same tooth cavities, somewhat thinner shell-like tooth structures.

I do not intend to be limited to the precise details shown or described.

I claim:

1. The method of making a shell-like porcelain tooth structure which comprises forming a tooth cavity in a flexible mold, supporting a core in said cavity with a space between the core and the wall of said tooth cavity, filling said space with moistened porcelain moistened with water or other temporary binder, and compacting the porcelain in said tooth cavity and around said core to the form of a firm shell-like tooth structure by prolonged vibration.

2. The method of making a shell-like porcelain tooth structure which comprises forming a tooth cavity in a flexible mold, supporting a core in said cavity with a space between the core and the wall of said tooth cavity, filling said space with porcelain moistened with water or other temporary binder, compacting the moistened porcelain in said tooth cavity and around said core to the form of a firm shell-like tooth structure by prolonged vibration, removing the shell-like tooth structure from the flexible mold, eliminating the core from the shell-like tooth structure, and thereafter firing the shell-like tooth structure to give it its final hardness.

3. The method of making a shell-like porcelain tooth structure which comprises forming a tooth cavity in a flexible mold, supporting a core in said cavity with a space between the core and the wall of said tooth cavity, filling said space with porcelain moistened with water or other temporary binder, compacting the moistened porcelain in said tooth cavity and around said core to the form of a firm shell-like tooth structure by prolonged vibration, removing the shell-like tooth structure and core from the flexible mold, removing the excess moisture, and heating the green porcelain shell-like tooth structure sufficiently to drive off the water which is still in the porcelain and later to soften and melt the core and cause it finally to penetrate into the green porcelain shell-like tooth structure, and cooling the green porcelain structure whereupon it is strong enough to be handled or stored before firing.

4. The method of making a shell-like porcelain tooth structure which comprises forming a tooth cavity in a flexible mold, supporting a flexible core in said cavity with a space between the core and the wall of said tooth cavity, filling said space with porcelain moistened with water or other temporary binder, compacting the moistened porcelain in said tooth cavity and around said core to the form of a firm shell-like tooth structure by prolonged vibration, removing the core out of the green porcelain shell-like tooth structure, removing the green porcelain shell-like tooth structure from the flexible mold, drying out said green porcelain shell-like tooth structure to drive off substantially all water, treating said shell-like tooth structure with hot wax or equivalent material, and cooling the green porcelain structure whereupon it is strong enough to be handled or stored before firing.

5. The method of making a shell-like tooth structure which comprises forming a tooth cavity in a flexible mold, supporting a core formed of an investment material in said cavity with a space between the core and the wall of said tooth cavity, filling said space with porcelain material moistened with water or other temporary binder, compacting the porcelain in said tooth cavity and around said core to the form of a firm shell-like tooth structure by prolonged vibration, removing the shell-like tooth structure and core from the flexible mold, firing the shell-like tooth structure with the core therein to give the shell-like structure its final hardness, and thereafter removing the core from said shell-like tooth structure.

6. The method of making a shell-like tooth structure which comprises forming a tooth cavity in a flexible mold, supporting a core formed of an investment material which sets chemically in said cavity with a space between the core and the wall of said tooth cavity, filling said space with porcelain material moistened with water or other temporary binder, compacting the porcelain in said tooth cavity and around said core to the form of a firm shell-like tooth structure by prolonged vibration, removing the shell-like tooth structure and core from the flexible mold, firing the shell-like tooth structure with the core therein to give the shell-like structure its final hardness, and thereafter removing the core from said shell-like tooth structure.

7. The method of making a shell-like porcelain tooth structure which comprises forming a tooth cavity in a flexible mold, supporting a core in said cavity with a space between the core and the wall of said tooth cavity, filling said space with porcelain moistened with water or other temporary binder, compacting the porcelain in said tooth cavity and around said core to the form of a firm shell-like tooth structure, removing the shell-like tooth structure from the mold, eliminating the core from said shell-like tooth structure, and applying an opacifier or a stain, or an opacifier and a stain, to the inside of the shell-like tooth structure.

8. The method of making a shell-like porcelain tooth structure which comprises forming a tooth cavity in a flexible mold, forming a core the dimensions of which are less than the dimensions of said tooth cavity, applying a stain or an opacifier, or an opacifier and stain, to said core, supporting said core in said tooth cavity with a space between the core and the wall of said cavity, filling said space with porcelain moistened with water or other temporary binder, compacting the porcelain in said tooth cavity and around said core to the form of a firm shell-like tooth structure by prolonged vibration, removing the shell-like tooth structure from the flexible mold, eliminating the core from the shell-like tooth structure, and thereafter firing the shell-like tooth structure to give it its final hardness.

REINER W. ERDLE.